United States Patent
Shahid (10) Patent No.: US 6,295,400 B1
(45) Date of Patent: Sep. 25, 2001

(54) MULTIPITCH OPTICAL FIBER RIBBON

(75) Inventor: Muhammed Afzal Shahid, Snellville, GA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/416,180

(22) Filed: Oct. 11, 1999

(51) Int. Cl.$^7$ .................................................. G02B 6/44
(52) U.S. Cl. .............................. 385/114; 385/89; 385/121
(58) Field of Search ................................. 385/114, 112, 385/89, 121

(56) References Cited

U.S. PATENT DOCUMENTS

| | | |
|---|---|---|
| 4,147,407 | 4/1979 | Eichenbaum et al. . |
| 4,900,126 | 2/1990 | Jackson et al. . |
| 5,259,051 | 11/1993 | Burack et al. . |
| 5,809,195 | * 9/1998 | Brown .................................. 385/114 |

FOREIGN PATENT DOCUMENTS 60-80806  *  5/1985  (JP) .

* cited by examiner

*Primary Examiner*—Cassandra Spyrou
*Assistant Examiner*—Leo Boutsikaris (57) ABSTRACT

A multipitch optical fiber ribbon includes optical fibers that extend longitudinally and are laterally adjacent. The optical fibers are bonded together by bonding material having opposite first and second ends. A lateral first spacing is defined between adjacent optical fibers at the first end of the bonding material and a lateral second spacing is defined between adjacent optical fibers at the second end of the bonding material, and the first spacing is different from the second spacing. The bonding material includes a first segment at the first end of the bonding material and a second segment at the second end of the bonding material. The composition of the first segment of the bonding material can be the same as the composition of the second segment of the bonding material, or the first and second segments of the bonding material can have different compositions.

11 Claims, 7 Drawing Sheets

MULTIPITCH OPTICAL FIBER RIBBON

FIELD OF THE INVENTION

The present invention relates to optical fiber ribbons and, more particularly, to the spacing between optical fibers of optical fiber ribbons.

BACKGROUND OF THE INVENTION

Optical fiber is a very popular medium for large bandwidth applications, and as a result there is a demand for increased numbers of optical fibers. In response to these demands, optical fiber ribbons have been developed. An optical fiber ribbon includes a planar array of optical fibers that extend longitudinally and are laterally adjacent, and the optical fibers are bonded together as a unit.

It is conventional for adjacent optical fibers of an optical fiber ribbon to be in an abutting side-by-side arrangement. As a result, the spacing between adjacent optical fibers in an optical fiber ribbon is often less than the spacing between adjacent optical receptacles of optical devices that optically communicate with the optical fiber ribbon. Optical devices that optically communicate with an optical fiber ribbon include optical input or output devices, which respectively introduce optical signals into or receive optical signals from the optical fibers of optical fiber ribbon. It is common to prepare an optical fiber ribbon for attachment to the optical receptacles of an optical input or optical output device by striping the bonding material of the optical fiber ribbon away from one end of the optical fiber ribbon. A sufficient amount of the bonding material is stripped away so that exposed ends of the optical fibers can be manually spaced apart from one another and be respectively received by the receptacles of the target optical device.

Often it is necessary for relatively long lengths of optical fibers to be exposed at the end of an optical fiber ribbon to obtain the spacing necessary to connect to the relatively far spaced apart receptacles of the target optical device. The binding material that holds the optical fibers of an optical fiber ribbon together provides some protection to the optical fibers; therefore, the optical fibers that are exposed by the stripping are at a relatively greater risk of being damaged. In addition, long lengths of loose optical fibers that extend from an optical fiber ribbon are at risk of becoming tangled and disorganized, and can be difficult to manually manage. These risks or disadvantages are becoming greater and greater as optical fibers and associated equipment become more densely packaged in response to the increasing demand for optical fibers.

SUMMARY OF THE INVENTION

The present invention solves the above problems, and other problems, by providing a multipitch optical fiber ribbon that can be readily connected between first and second arrays of optical receptacles, wherein the spacing in the first array is different from the spacing in the second array. More specifically, the multipitch optical fiber ribbon includes optical fibers that extend longitudinally and are laterally adjacent. The optical fibers are bonded together by bonding material having opposite first and second ends. A lateral first spacing is defined between adjacent optical fibers at the first end of the bonding material, a lateral second spacing is defined between adjacent optical fibers at the second end of the bonding material, and the first spacing is different from the second spacing. In accordance with one example, the are no splices between the optical fibers, and no crossing of the optical fibers, between the first and second ends of the bonding material.

In accordance with another aspect of the present invention, the bonding material includes a first segment at the first end of the bonding material and a second segment at the second end of the bonding material. Preferably the first and second segments of the bonding material are contiguous. The composition of the first segment of the bonding material can be the same as the composition of the second segment of the bonding material, or the first and second segments of the bonding material can have different compositions. For example, the first section of the bonding material can be in the form of a solidified polymeric material that fills the interstices between the optical fibers and extends to the outside boundary of the optical fiber ribbon, and the second section of the bonding material can be in the form of one or more tapes having an adhesive backing on the side of the tape that is oriented toward the optical fibers. In accordance with one version of the multipitch optical fiber ribbon, the first segment of the bonding material defines a first width and the second segment of the bonding material defines a second width that is greater than the first width.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
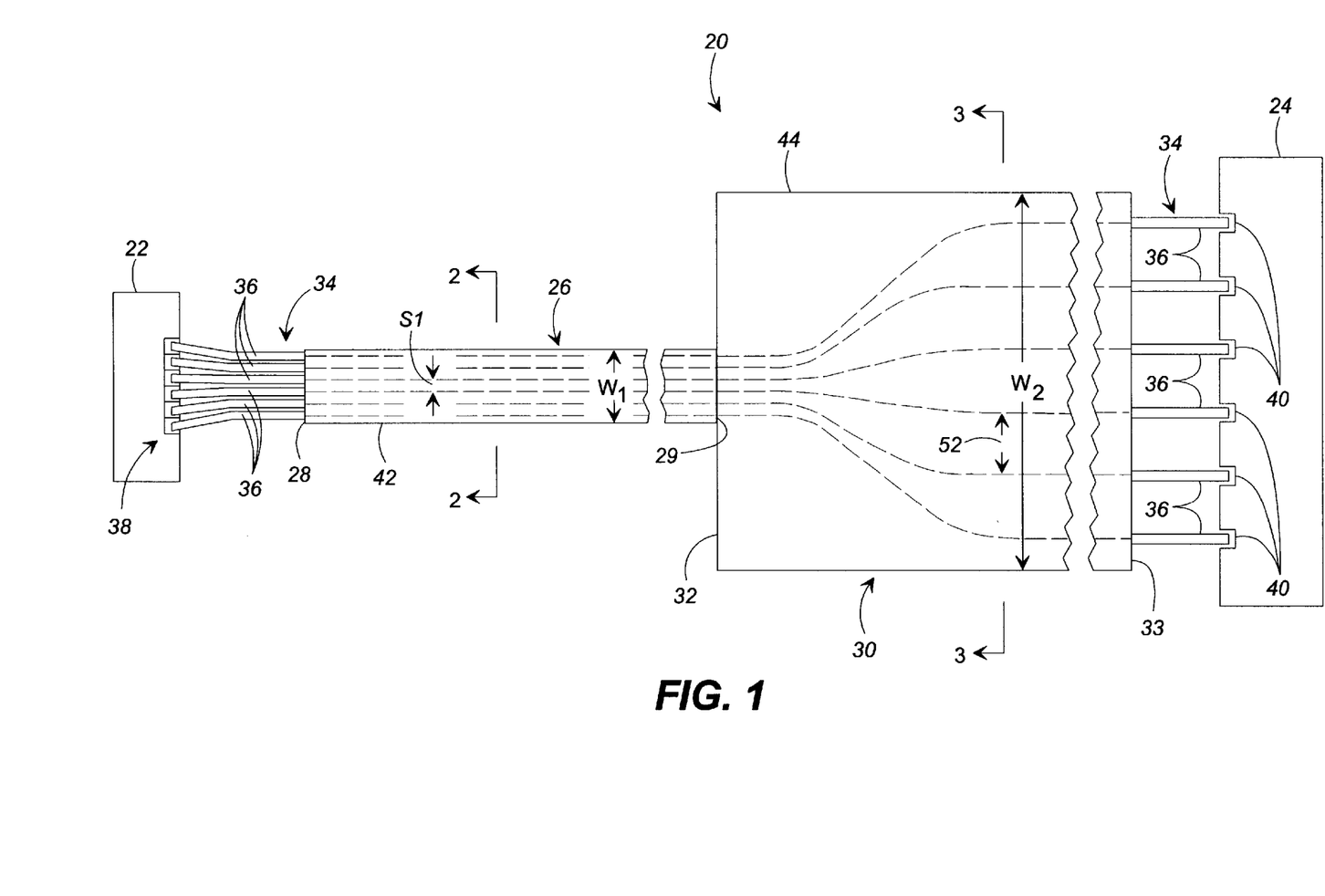
FIG. 1 is a schematic view of a multipitch optical fiber ribbon connected between optical devices in accordance with a first embodiment of the present invention.

FIG. 1 illustrates a multipitch optical fiber ribbon 20 extending in a longitudinal direction between and connected between an optical device 22 and an optical device 24, in accordance with a first embodiment of the present invention. Each of the optical devices 22, 24 can be a wide variety of different optical devices, such as optical transmitters that transmit optical signals into optical fibers and optical receivers that receive optical signals from optical fibers. More specifically, the optical devices 22, 24 can include optical/electromechanical systems or switches, optical cross connects, and a wide variety of other types of optical devices that connect to and optically communicate with an array of optical fibers.

In accordance with the first embodiment, the multipitch optical fiber ribbon 20 includes a relatively narrow section 26 having opposite relatively narrow ends 28, 29, and a relatively wide section 30 having opposite relatively wide ends 32, 33. In accordance with the first embodiment, the narrow section 26 in isolation is a conventional optical fiber ribbon; therefore, at times the terms narrow section 26 and conventional fiber ribbon 26 are used interchangeably when describing the first embodiment. It is preferred for the multipitch optical fiber ribbon 20 to be generally planar, yet flexible enough so that it can be manually bent into a variety of curved shapes so that it can be routed around various obstacles, or the like.

As illustrated in FIG. 1, receptacles of an array of receptacles 38 of the optical device 22 are respectively in receipt of the ends of the optical fibers 36 that extend from the narrow end 28, and receptacles 40 of the optical device 24 are respectively in receipt of the ends of the optical fibers 36 that extend from the wide end 33. As will be discussed in greater detail below, different spacing between the optical fibers 36 at the differently sized ends 28, 33 allows the multipitch optical fiber ribbon 20 to be conveniently and efficiently connected between the array of receptacles 38 and the receptacles 40, which are spaced differently.

The multipitch optical fiber ribbon 20 includes a laterally extending array 34 of longitudinally extending optical fibers 36 that extend between the narrow end 28 and the wide end 33. Each of the optical fibers have opposite ends that respectively protrude from the narrow end 28 and the wide end 33. The optical fibers 36 are laterally adjacent and are held together by bonding material 42, 44. In FIG. 1, the centerlines of the portions of the optical fibers 36 that are embedded in the bonding material 42, 44 are illustrated by dashed lines that extend between the narrow end 28 and the wide end 33. In accordance with the first embodiment, the array 34 is absent of splices between the optical fibers 36 between the narrow end 28 and the wide end 33, and none of the optical fibers cross one another between the narrow end 28 and the wide end 33.

A relatively small separation spacing "S1" is defined between the centerlines of adjacent optical fibers 36 in the narrow section 26 of the multipitch optical fiber ribbon 20, and the separation spacing S1 is approximately the same as the spacing between adjacent receptacles of the array of receptacles 38 of the optical device 22. A relatively large separation spacing "S2" is defined between the centerlines of adjacent optical fibers 36 in the wide section 30 of the multipitch optical fiber ribbon 20, and the separation spacing S2 is approximately the same as the spacing between the adjacent receptacles 40 of the optical device 24. The separation spacing S2 is greater than the separation spacing S1, as will be discussed in greater detail below. The spacing between optical fibers of an optical fiber ribbon is often referred to as pitch. Accordingly, the optical fiber ribbon of the first embodiment is referred to as the multipitch optical fiber ribbon 20 because it has more than one pitch. In addition, the narrow section 26 of the multipitch optical fiber ribbon 20 defines a relatively small width "W1" that is smaller than a relatively large width "W2" defined by the wide section 30 of the multipitch optical fiber ribbon 20.

Figure 2:
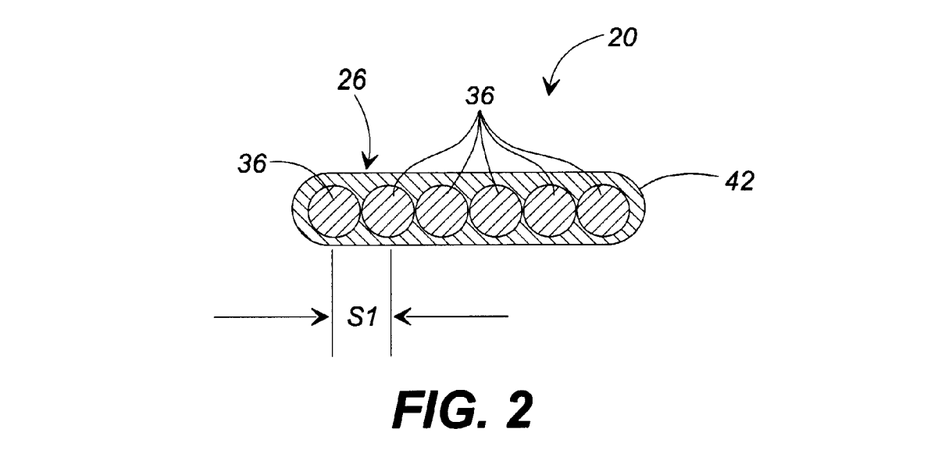
FIG. 2 is an isolated, schematic cross-sectional view of the multipitch optical fiber ribbon of FIG. 1 taken along line 2—2 of FIG. 1.

In accordance with the first embodiment, in the narrow section 26 of the multipitch optical fiber ribbon 20 the optical fibers 36 are held together by a homogeneous bonding material 42 that extends between the opposite narrow ends 28, 29. The homogeneous bonding material 42 is best seen in FIG. 2, which is a schematic cross-sectional view of the narrow section 26 of the multipitch optical fiber ribbon 20 taken along line 2—2 of FIG. 1. FIG. 2 and all other cross-sectional views are schematic because, for example, it is preferred for each of the optical fibers 36 to be conventional coated glass fibers, but the coatings are not distinguished from the glass fibers in the figures.

In accordance with the first embodiment, the homogeneous bonding material 42 is preferably a polymeric bonding material, and an acceptable design for the narrow section 26 of the multipitch optical fiber ribbon 20 is described in U.S. Pat. No. 4,900,126, which is incorporated herein by reference. Briefly, the homogeneous bonding material 42 is preferably an ultraviolet-curable matrix bonding material, or the like. The homogeneous bonding material 42 material fills the interstices between the optical fibers 36, binds together the optical fibers, and extends to the outside boundary of the narrow section 26 of the multipitch optical fiber ribbon 20.

A known ultraviolet-curable matrix material from which the homogeneous bonding material 42 is acceptably formed includes a resin, a diluent and a photoinitiator. The resin may include a diethylenic-terminated resin synthesized from a reaction of hydroxy-terminated alkyl acrylate with the reaction product of a polyester of polyethyl polyol of molecular weight of 1,000 to 6,000 with an aliphatic or aromatic diisocyanate, or diethylenic-terminated resin synthesized from the reaction of glycidyl acrylate with a carboxylic-terminated polymer or polyether of molecular weight 1,000 to 6,000. The diluent may include monofunctional or multifunctional acrylic acid esters having a molecular weight of 100 to 1,000 or N-vinylpyrrolidinone. For the photoinitiator, the composition may include ketonic compounds such as diethoxyacetophenone, acetophenone, benzophenone, benzoin, anthraquinone, and benzil dimethyl ketal. In a typical composition, the bonding matrix may include a resin (50–90%), diluents (5–40%), and a photoinitiator (1–10%). All percentages are by weight unless otherwise noted.

Figure 3:
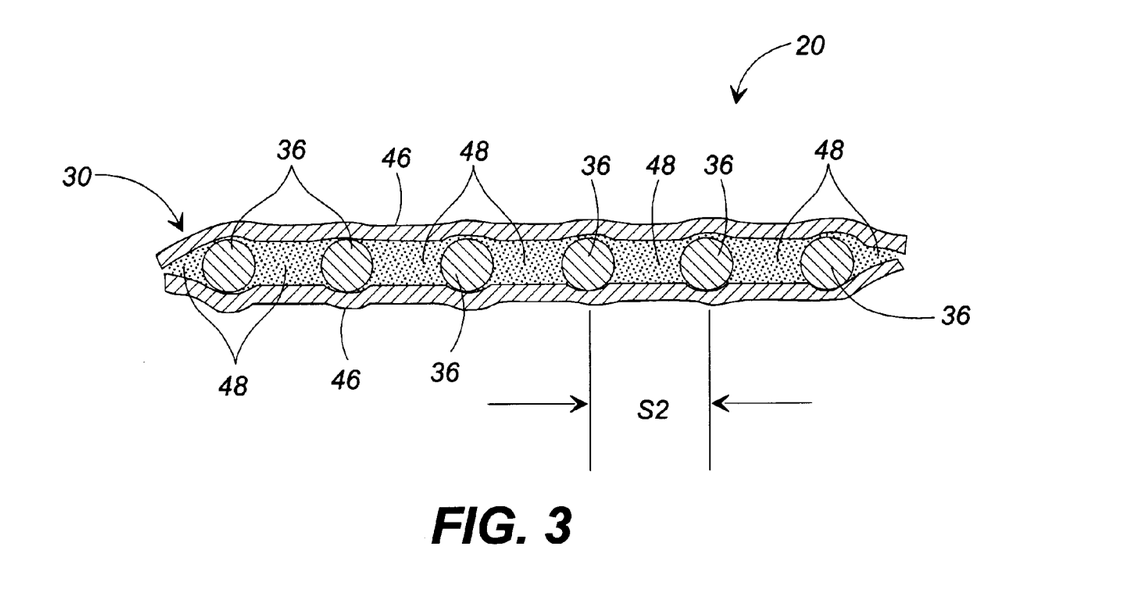
FIG. 3 is an isolated, schematic cross-sectional view of the multipitch optical fiber ribbon of FIG. 1 taken along line 3—3 of FIG. 1.

In accordance with the first embodiment, in the wide section 30 of the multipitch optical fiber ribbon 20 the optical fibers 36 are held together by a composite bonding material 44 that extends between the opposite wide ends 32, 33. The composite bonding material 44 is best seen in FIG. 3, which is a schematic cross-sectional view of the wide section 30 of the multipitch optical fiber ribbon 20 taken along line 3—3 of FIG. 1. In accordance with the first embodiment, the composite bonding material 44 includes longitudinally extending pieces of tape 46 that are positioned on opposite sides of the optical fibers 36. The composite bonding material 44 further includes adhesive 48 that is positioned between the inner surfaces of the tapes 46 and extends into the interstices between the optical fibers 36. The adhesive 48 preferably originates as backings on the inside surfaces of the tapes 46.

Figure 4:
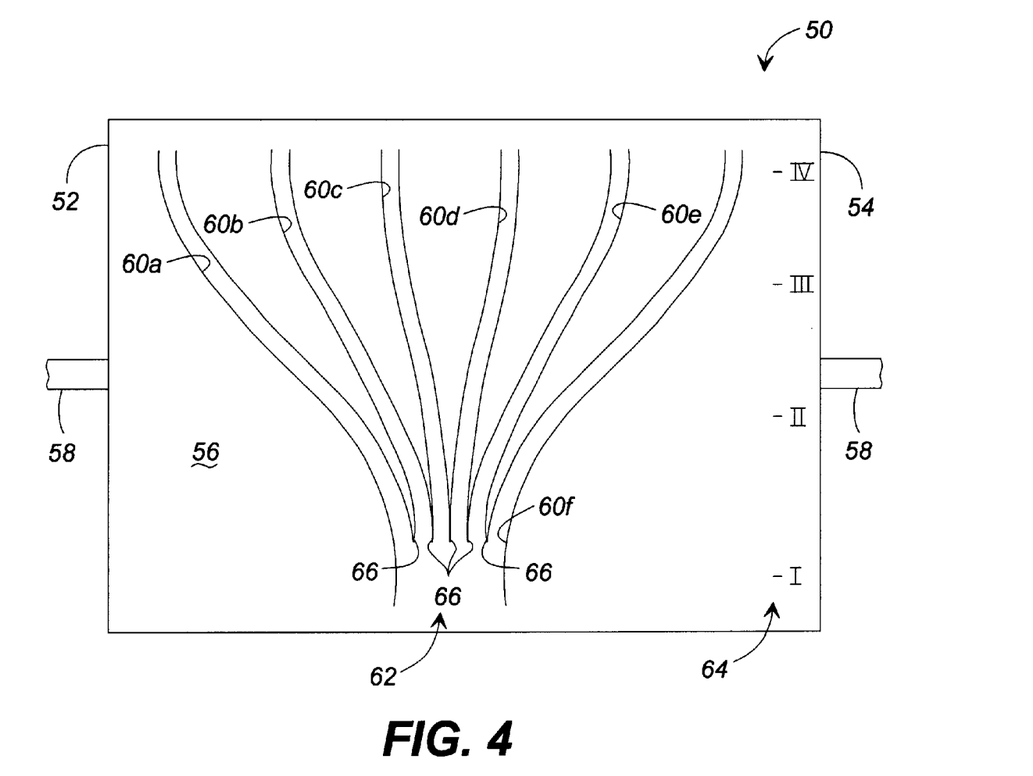
FIG. 4 is a top plan view of a guide cylinder that is part of a fabricating assembly for manufacturing the multipitch optical fiber ribbon of FIG. 1, in accordance with the first embodiment of the present invention.
Figure 5:
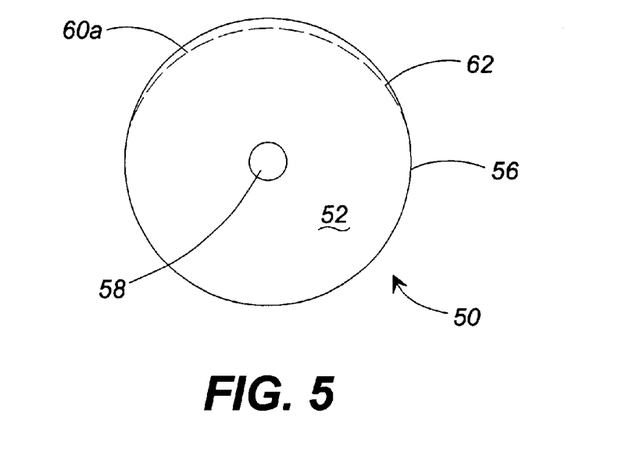
FIG. 5 is a schematic end elevation view of the guide cylinder of FIG. 4.
Figure 6:
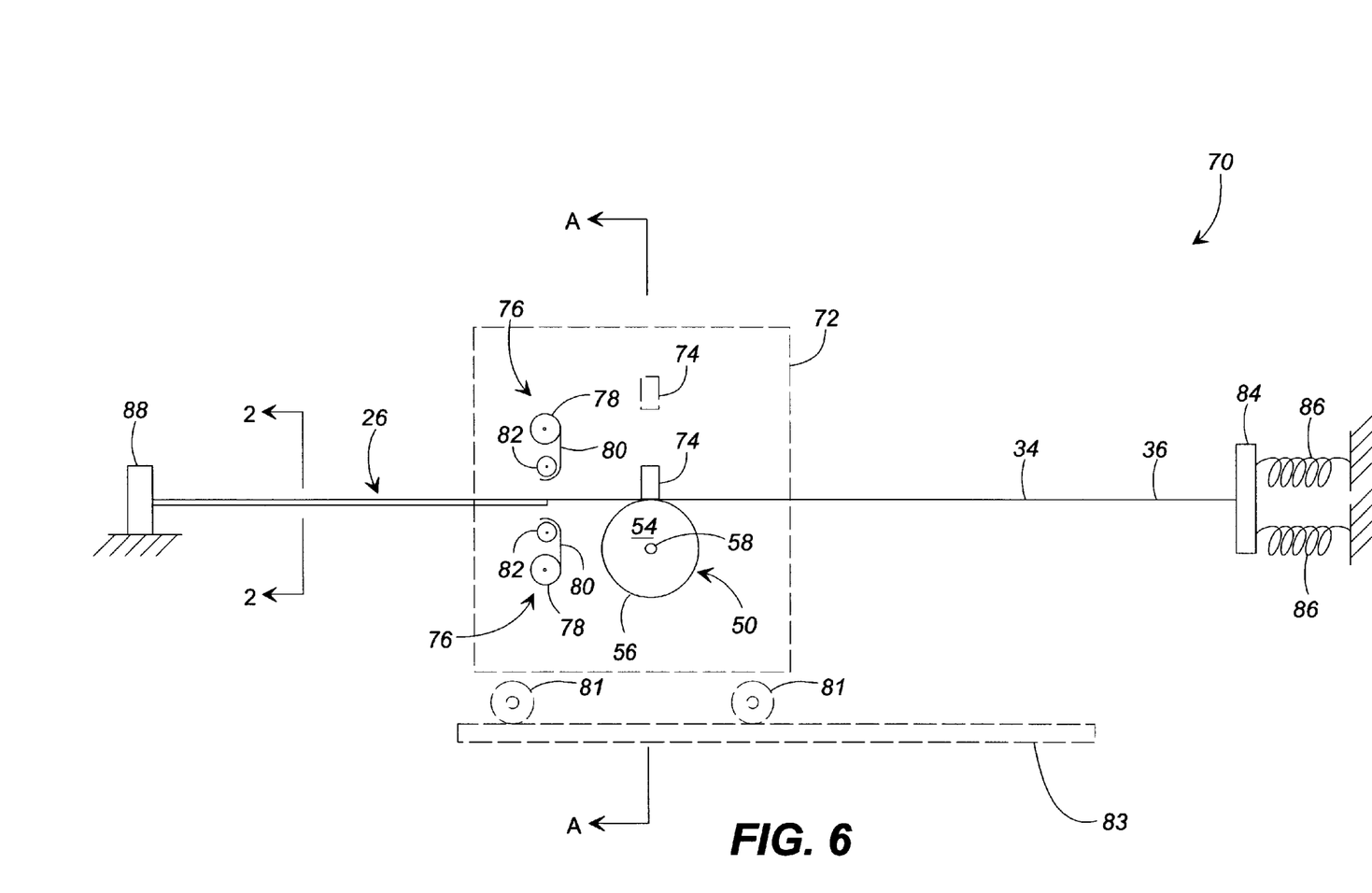
FIG. 6 is a schematic view of the fabricating assembly for forming the multipitch optical fiber ribbon of FIG. 1, wherein the fabricating assembly is partially set up for operation and includes the guide cylinder of FIGS. 4 and 5, in accordance with the first embodiment of the present invention.
Figure 11:
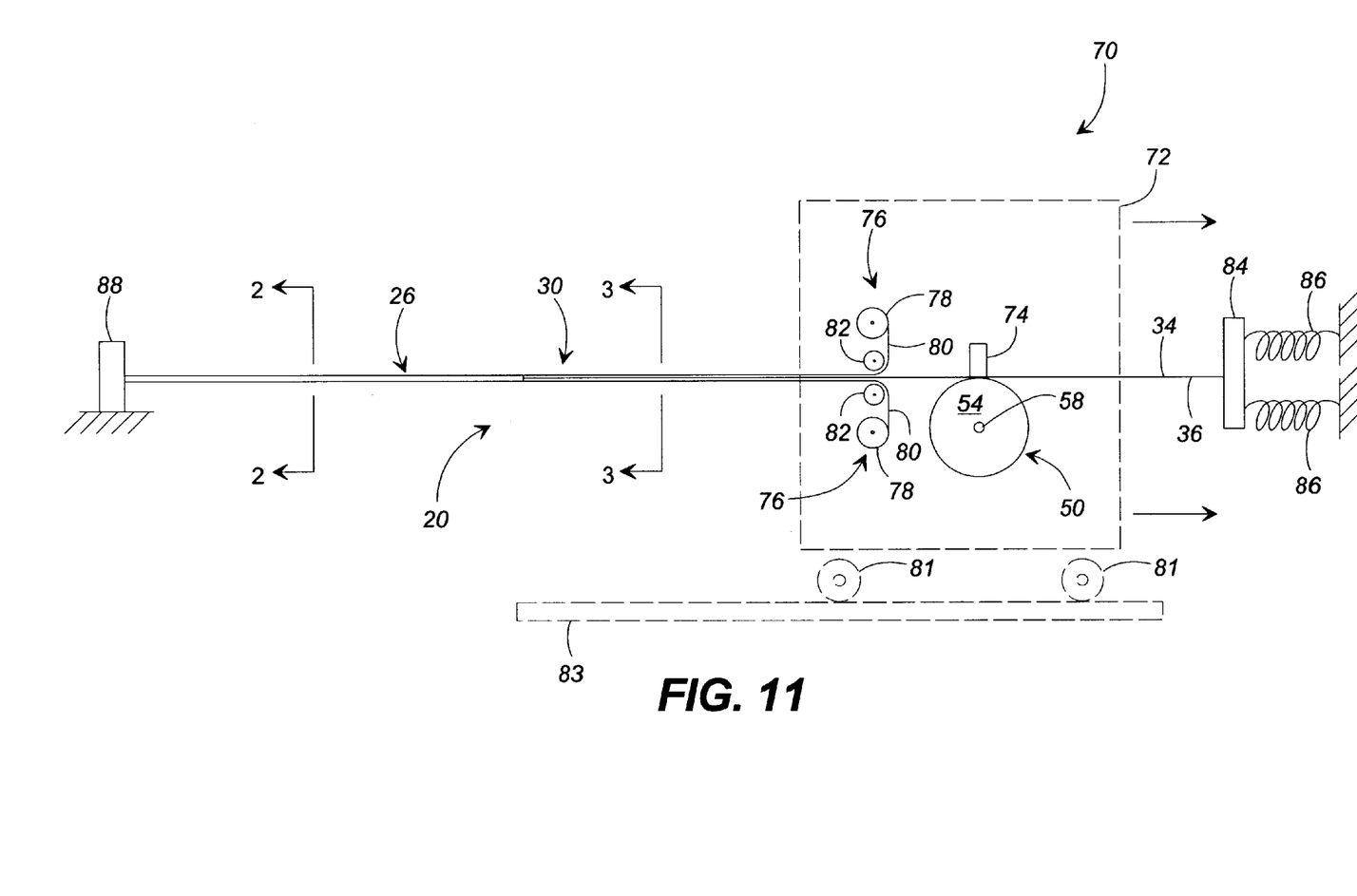
FIG. 11 is a schematic view of the fabricating assembly of FIG. 6 in operation, in accordance with the first embodiment of the present invention.

As will be discussed in greater detail below, in accordance with the first embodiment, the wide section 30 of the multipitch optical fiber ribbon 20 is preferably constructed using a fabricating assembly 70 (FIGS. 6 and 11). Central to the fabricating assembly is a spacing device that can be referred to as a spacing guide member, and in accordance with the first embodiment the spacing guide member is in the form of a guide cylinder 50, which is illustrated in FIGS. 4 and 5. In accordance with the first embodiment, it is preferred for the spacing guide member to have some arcuate characteristics, but it is not necessary for the spacing guide member to be cylindrical.

As best understood with reference to FIG. 4, in accordance with the first embodiment the guide cylinder 50 includes generally circular opposite ends 52, 54. The guide cylinder 50 further includes a cylindrical wall that includes an outer cylindrical surface 56. The outer surface 56 extends laterally between the opposite ends 52, 54 and extends arcuately around an axis that is concentric with an axle 58 about which the guide cylinder 50 can rotate.

Defined in the guide cylinder 50 are multiple narrow guide grooves 60a–f that diverge from a wide guide groove 62. Each of the grooves 60a–f, 62 are open at the outer surface 56 and extend arcuately partially around the axle 58. Although the guide cylinder 50 is described as including six narrow guide grooves 60a–f and the multipitch optical fiber ribbon 20 (FIGS. 1, 2, and 3) is described as including six optical fibers 36 (FIGS. 1–3), it is within the scope of the present invention for the guide cylinder to include a greater or lesser number of narrow guide grooves and for the multipitch optical fiber ribbon to include a greater or lesser number of optical fibers.

In accordance with the first embodiment, a series of marks 64 are defined across the outer surface 56 of the guide cylinder 50. The series of marks 64 is illustrated and described as including a Roman number I mark, Roman number II mark, Roman number III mark, and Roman number IV mark that designate intervals along the grooves 60a–f, 62 in the arcuate direction. The series of marks 64 can incorporate a wide variety of different indicia for designating different intervals along the grooves 60a–f, 62.

As will be discussed in greater detail below with reference to FIGS. 7–10, the wide guide groove 62 defines a width "W3", the narrow guide grooves 60a–f define a width "W4", and each of those grooves define a depth "D". As best understood with reference to FIG. 4 and FIG. 5, in which the wide guide groove 62 and the narrow guide groove 60a are shown by broken lines, the depth of each of the grooves 60a–f, 62 is uniform along the length of the groove, except as noted. More specifically, the depths of the narrow guide grooves 60a–f taper to zero just past the Roman number IV mark in the direction away from the Roman number III mark. In addition, the depth of the wide guide groove 62 tapers to zero just past the Roman number I mark in the direction away from the Roman number II mark. As illustrated in FIG. 4, the width of each of the grooves 60a–f, 62 is uniform along the length thereof. In addition, edges 66 that define the transition between the wide guide groove 62 and the narrow guide grooves 60a–f are smooth and slightly rounded to facilitate smooth passage of the optical fibers 36 (FIGS. 1–3) from the wide guide groove to the narrow guide grooves, as will be discussed in greater detail below.

FIG. 6 illustrates the fabricating assembly 70 partially set up for fabricating the multipitch optical fiber ribbon 20 (FIG. 1) from a conventional optical fiber ribbon 26 having an exposed array 34 of optical fibers 36 (FIG. 1) extending therefrom, in accordance with the first embodiment. In accordance with one method of the present invention, it is preferred for a portion of the binder material 42 (FIG. 2) to be stripped from an end of an isolated conventional optical fiber ribbon 26 to expose the array 34 of optical fibers 36, and thereafter for the multipitch optical fiber ribbon 20 to be formed therefrom, as described below.

In accordance with the first embodiment, the fabricating assembly 70 includes a frame 72, which is illustrated by broken lines, that carries the opposite ends of the axle 58 of the guide cylinder 50 (also see FIGS. 4 and 5). In accordance with the first embodiment, the frame 72 optionally carries a cross member 74 that is moveable between a remote position that is illustrated by dashed lines and a proximate position that is illustrated by solid lines in FIG. 6. The cross member 74 is distant from the guide cylindrical 50 while in the remote position. In contrast, the cross member 74 is in close proximity to the apex of the outer surface 56 of the guide cylinder 50 while in the proximate position. Depending upon the rotational position of the guide cylinder 50 about the axle 58, the cross member 74 can extend laterally across the grooves 60a–f, 62 (FIGS. 4 and 5) while in the proximate position, as will be discussed in greater detail below.

In accordance with the first embodiment, the frame 72 is moveable and the movability is acceptably facilitated, in part, by a pair of wheels 81 that travel along a track 83, all of which is illustrated by broken lines in FIG. 6. More specifically, the frame 72 is movable in a direction between a downstream holding device 88 and an upstream holding device 84. The upstream holding device 84 is a gripping or clamping device that holds the free end of the exposed array 34 of optical fibers 36. Preferably the upstream holding device 84 is equipped with a tensioning mechanism 86, such as a pair of springs, or the like, that maintains a desired tension on the exposed array 34 as it is acted upon, as will be discussed in greater detail below. The downstream holding device 88 is a gripping or clamping device that holds the end of the conventional optical fiber ribbon 26.

In accordance with the first embodiment, a pair of tape application assemblies 76 are positioned on opposite sides of the conventional optical fiber ribbon 26 and are carried by the frame 72. The tape application assemblies 76 are operative for applying the composite bonding material 44 (FIG. 3) to the exposed array 34 of optical fibers 36. The tape application assemblies 76 are positioned remotely from the conventional optical fiber ribbon 26 in FIG. 6. In accordance with the first embodiment, the frame 72 includes mechanisms (not shown) for moving the tape application assemblies 76 from their remote positions illustrated in FIG. 6 to positions in which the tape application assemblies are more proximate to the exposed array 34 of optical fibers 36.

As illustrated in FIG. 6, each tape application assembly 76 acceptably includes a roll 78 of tape and an applicator roller 82, or the like. For each tape application assembly 76, the tape 80 is preferably in the form of a tape 46 (FIG. 3), such as a water-blocking tape, that is backed on one side with adhesive 48 (FIG. 3). In accordance with an alternative embodiment, the adhesive 48 is applied to the exposed array 34 of optical fibers 36 and thereafter the tape 46 is applied to the combination of the adhesive and the exposed array of optical fibers. In accordance with this alternative embodiment, the adhesive can be applied by spraying or other coating techniques.

The frame 72, wheels 81, and track 83 are illustrated in broken lines in FIG. 6 because in accordance with the first embodiment a variety of different frames and moving mechanisms therefor are suitable for carrying out the movement operations of the present invention. For example, in accordance with one embodiment of the present invention the frame 72, wheels 81, and track 83 are not required. As one example, the guide cylinder 50 can be a handheld device that is manually moved along the exposed array 34 of optical fibers 36 and the tape 80 can be manually applied to the exposed array of optical fibers without using the specifically illustrated tape application assemblies 76.

Referring to FIGS. 4 and 6, operations of the fabricating assembly 70 will be described in accordance with the first embodiment. The fabricating assembly 70 is set up for operation by having the cross member 74 in its remote position, which is illustrated by broken lines in FIG. 6, and rotating the guide cylinder 50 about its axle 58 so that the Roman number I mark is at the apex of the outer surface 56 of the guide cylinder. Thereafter, an end of the conventional optical fiber ribbon 26 is connected to the downstream holding device 88 and the exposed array 34 of optical fibers 36 extending from the conventional optical fiber ribbon 26 is connected to the upstream holding device 84 so that the array passes through the portion of the wide guide groove 62 (FIGS. 4 and 5) that is at the apex of the outer surface 56 of the guide cylinder 50. Then the cross member 74 is moved to its proximate position, at which time the fabricating assembly 70 can be characterized as being in a first configuration. In the first configuration, a portion of the exposed array 34 of optical fibers 36 extends through at least a portion of the wide guide groove 62 and the Roman number I mark is aligned with the cross member.

Figure 7:
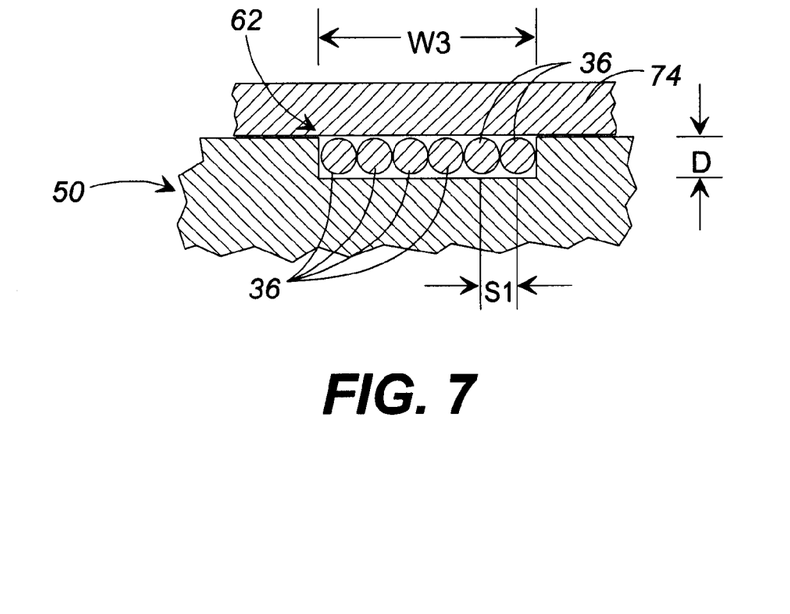
FIG. 7 is a schematic, partial cross-sectional view taken along line A—A of FIG. 6 with the guide cylinder in a first configuration, in accordance with the first embodiment of the present invention.

FIG. 7 is a partial, schematic cross-sectional view taken along line A—A of FIG. 6 with the fabricating assembly 70 in the first configuration, in accordance with the first embodiment. As best seen in FIG. 7 and as mentioned above, the wide guide groove 62 defines a width W3 and a depth D. The width W3 is slightly greater than the number of optical fibers 36 within the wide guide groove 62 multiplied by the diameter of those optical fibers. The depth D that is slightly greater than the diameter of the optical fibers 36. Like in the narrow section 26 (FIGS. 1 and 2) of the multipitch optical fiber ribbon 20 (FIGS. 1 and 2), approximately the separation spacing S1 is defined between the centers of the portions of adjacent optical fibers 36 illustrated in FIG. 7. In accordance with the first embodiment, each of the optical fibers has a diameter of approximately 250 microns, and in FIG. 7 the sides of adjacent optical fibers 36 are abutting one another, so that the separation spacing S1 is approximately 250 microns.

From the viewpoint of FIG. 6, while the fabricating assembly 70 is in the first configuration, which is illustrated in FIG. 7, the spacing between the portions of the optical fibers 36 (FIG. 7) engaged by the guide cylinder 50 can be gradually increased in a consistent and controlled manner by rotating the guide cylinder 50 counterclockwise about its axle 58. More specifically, the guide cylinder 50 can be rotated counterclockwise about its axle 58, so that the Roman number II mark, Roman number III mark, or Roman number IV mark (FIG. 4) is aligned with and in contact with the bottom surface of the cross member 74. As the guide cylinder 50 is rotated counterclockwise, relative motion occurs between the portions of the optical fibers 36 engaged by the guide cylinder 50 and the narrow guide grooves 60a–f. As will become apparent, the guide grooves 60a–f respectively define travel paths, and as the guide cylinder 50 is rotated the optical fibers 36 respectively advance along those travel paths such that the optical fibers become further laterally spaced apart.

As best understood with reference to FIGS. 4 and 6, by having the fabricating assembly 70 in the first configuration, which is illustrated in FIG. 7, and then rotating the guide cylinder 50 counterclockwise about its axle 58 so that the Roman number II mark is aligned with and in contact with the bottom surface of the cross member 74, a second configuration is achieved. The second configuration is characterized by a portion of the exposed array 34 of optical fibers 36 extending through respective portions of the narrow guide grooves 60a–f and the Roman number II mark being aligned with the cross member 74.

Figure 8:
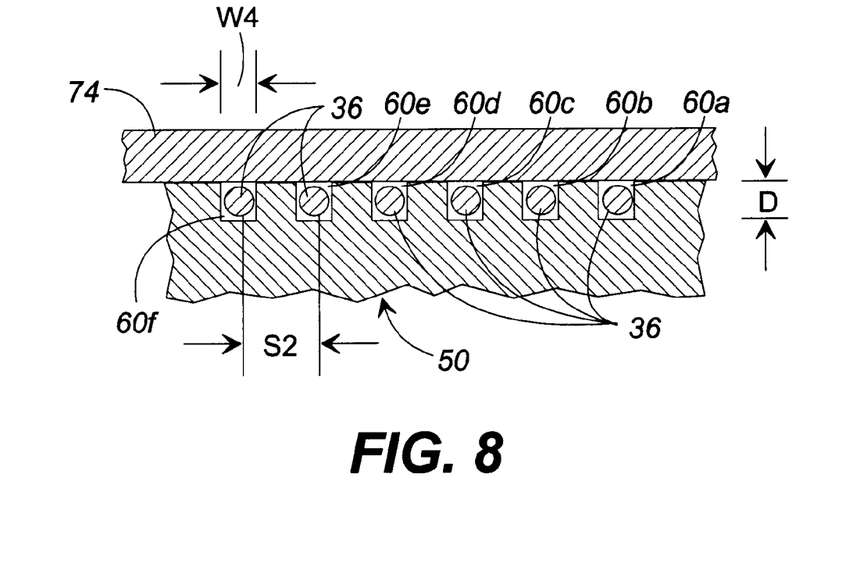
FIG. 8 is a schematic, partial cross-sectional view taken along line A—A of FIG. 6 with the guide cylinder in a second configuration, in accordance with the first embodiment of the present invention.

FIG. 8 is a partial, schematic cross-sectional view taken along line A—A of FIG. 6, with the fabricating assembly 70 in the second configuration. Like in the wide section 30 (FIGS. 1 and 2) of the multipitch optical fiber ribbon 20 (FIG. 1), approximately the separation spacing S2 is defined between the centers of each of the portions of the adjacent optical fibers 36 illustrated in FIG. 8. Likewise, approximately the separation spacing S2 is defined between the centers of the portions of each of the adjacent narrow guide grooves 60a–f illustrated in FIG. 8. In accordance with the first embodiment, the separation spacing S2 is at least approximately twice as great as the separation spacing S1 (FIGS. 1, 2, and 7), and more specifically the separation spacing S2 is approximately 500 microns.

As best understood with reference to FIGS. 4 and 6, by having the fabricating assembly 70 in the first configuration, which is illustrated in FIG. 7, and then rotating the guide cylinder 50 counterclockwise about its axle 58 so that the Roman number III mark is aligned with and in contact with the bottom surface of the cross member 74, a third configuration is achieved. The third configuration is characterized by a portion of the exposed array 34 of optical fibers 36 extending through respective portions of the narrow guide grooves 60a–f and the Roman number III mark being aligned with the cross member 74.

Figure 9:
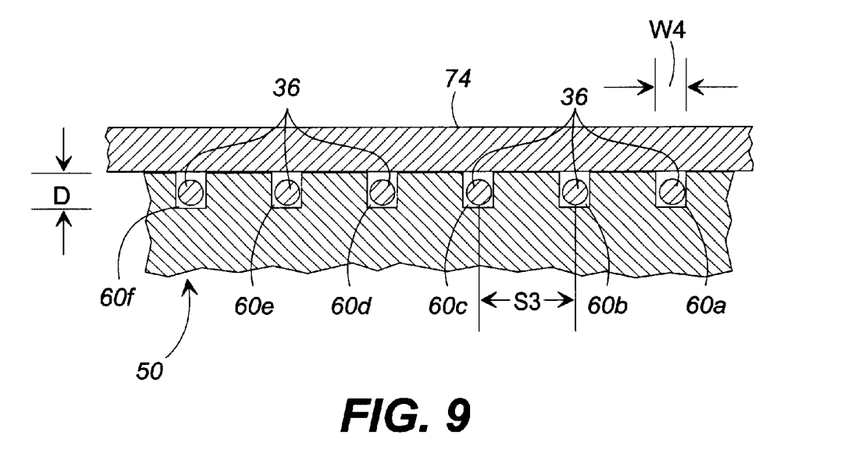
FIG. 9 is a schematic, partial cross-sectional view taken along line A—A of FIG. 6 with the guide cylinder in a third configuration, in accordance with the first embodiment of the present invention.

FIG. 9 is a partial, schematic cross-sectional view taken along line A—A of FIG. 6, with the fabricating assembly 70 in the third configuration. A separation spacing "S3" is defined between the centers of each of the portions of the adjacent optical fibers 36 illustrated in FIG. 9. Likewise, approximately the separation spacing S3 is defined between the centers of each of the portions of the adjacent narrow guide grooves 60a–f illustrated in FIG. 9. In accordance with the first embodiment, the separation spacing S3 is at least approximately three times greater than the separation spacing S1 (FIGS. 1, 2, and 7), and more specifically the separation spacing S3 is approximately 750 microns.

As best understood with reference to FIGS. 4 and 6, by having the fabricating assembly 70 in the first configuration, which is illustrated in FIG. 7, and then rotating the guide cylinder 50 counterclockwise about its axle 58 so that the Roman number IV mark is aligned with and in contact with the bottom surface of the cross member 74, a fourth configuration is achieved. The fourth configuration is characterized by a portion of the exposed array 34 of optical fibers 36 extending through respective portions of the narrow guide grooves 60a–f and the Roman number IV mark being aligned with the cross member 74.

Figure 10:
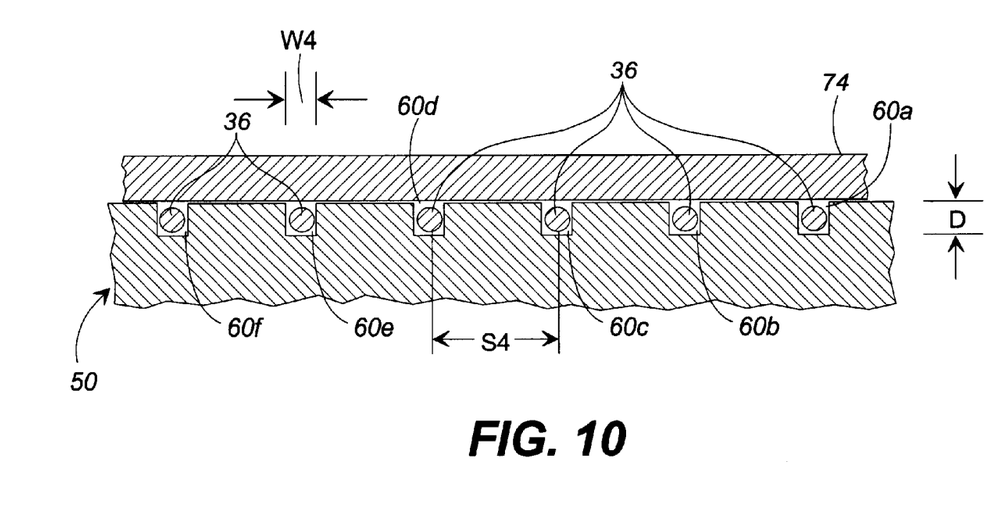
FIG. 10 is a schematic, partial cross-sectional view taken along line A—A of FIG. 6 with the guide cylinder in a fourth configuration, in accordance with the first embodiment of the present invention.

FIG. 10 is a partial, schematic cross-sectional view taken along line A—A of FIG. 6, with the fabricating assembly 70 in the fourth configuration. A separation spacing "S4" is defined between the centers of each of the portions of the adjacent optical fibers 36 illustrated in FIG. 10. Likewise, approximately the separation spacing S4 is defined between the centers of each of the portions of the adjacent narrow guide grooves 60a–f illustrated in FIG. 9. In accordance with the first embodiment, the separation spacing S4 is at least approximately four times greater than the separation spacing S1 (FIGS. 1, 2, and 7), and more specifically the separation spacing S4 is approximately 1000 microns.

As best seen in FIGS. 8–10 and as mentioned above, each of the narrow guide grooves 60a–f defines a width W4 and the above-discussed depth D. The width W4 is slightly greater than the diameter of the optical fibers 36.

In accordance with the first embodiment, in each of the first through fourth configurations respectively illustrated by FIGS. 7–10, the optical fibers 36 extend in a plane that is approximately tangent to the innermost surfaces of the guide cylinder 50 that define the respective groove(s) 60a–f, 62 so that only small arcuate lengths of the respective groove(s) are occupied at any time by the optical fibers 36. Accordingly, in each of the second through fourth configurations respectively illustrated by FIGS. 8–10, only a small arcuate length of each of the narrow guide grooves 60a–f is occupied at any time by its respective optical fiber 36, and each of those small arcuate lengths can be characterized as an active portion or a spacing guide portion. As best seen in FIGS. 8–10, the cross member 74 cooperates with the spacing guide portions to define what can be characterized as spacing apertures through which the optical fibers 36 respectively extend. The spacing guide portions and spacing apertures move laterally with respect to one another as the guide cylinder 50 is rotated, as is best understood with reference to FIGS. 7–10, which sequentially illustrate rotational positions of the guide cylinder.

As best understood with reference to FIGS. 4 and 7–10, the rate at which the narrow guide grooves 60a–f transition from the separation spacing S1 to the separation spacing S2, from the separation spacing S2 to the separation spacing S3, and from the separation spacing S3 to the separation spacing S4 is preferably sufficiently gradual so as not to cause the optical fibers 36 to be damaged by stress and strain when the optical fibers 36 are moved between the first through fourth configurations.

As best understood with reference to FIGS. 6 and 8–10, the fabricating assembly 70 is set up for operation by establishing the desired spacing between the optical fiber ribbons 36, which is achieved by placing the fabricating assembly 70 in the second configuration (FIG. 8), the third configuration (FIG. 9), or the third configuration (FIG. 9), or in any of the other numerous configurations that are between the first configuration (FIG. 7) and the fourth configuration. Thereafter, the guide cylinder 50 is preferably locked with a locking mechanism (not shown) so that the guide cylinder will not rotate relative to the cross member 74. As best seen in FIG. 11, in accordance with the first embodiment, the tape application assemblies 76 are placed in their proximate positions by moving them toward one another so that the applicator rollers 82 force the adhesive sides of the tape 80 onto or immediately adjacent to the opposite sides of the narrow end 29 (FIG. 1) of the conventional multipitch optical fiber ribbon 26.

After the fabricating assembly 70 is fully set up for operation as described above, the exposed array 34 of optical fibers 36 is advanced through the respective spacing guide portions of the narrow guide grooves 60a–f. As mentioned above, in each of the second through fourth configurations respectively illustrated by FIGS. 8–10, only a small arcuate length of each of the narrow guide grooves 60a–f is occupied at any time by the respective one of the optical fibers 36, and each of those small arcuate lengths can be characterized as an active portion or a spacing guide portion. In accordance with the first embodiment, the advancing is achieved by moving the guide cylinder 50 relative to the optical fibers 36, and preferably that movement is translational. More specifically, the advancing is achieved by moving the frame 72 along the track 83, as illustrated in FIG. 11. The frame 72 is one example of a moving device for advancing the optical fibers 36 in the longitudinal direction through their respective spacing guide portions of the guide grooves 60a–f so that the spacing of the spacing guide portions is imparted upon portions of the optical fibers that are downstream from the guide cylinder 50.

As best seen in FIG. 11, as the frame 72 moves toward the upstream holding device 84, the pieces of tape 80 are longitudinally applied to the opposite sides of the exposed array 34 of optical fibers 36 that are downstream from the guide cylinder 50 to form the wide section 30 of the multipitch optical fiber ribbon 20. Alternatively, one or more pieces of the tape 80 may be helically wrapped around the exposed array 34 of optical fibers 36 that are downstream from the guide cylinder 50 to form the wide section 30 of the multipitch optical fiber ribbon 20. The formed multipitch optical fiber ribbon 20 is removed from the fabrication assembly 70 by releasing the narrow section 26 from the downstream holding device 88, releasing the array 34 of optical fibers 36 from the upstream holding device 84, and moving the cross member 74 to its remote position, which is illustrated by broken lines in FIG. 6.

In accordance with the first embodiment, the wide section 30 of the multipitch optical fiber ribbon 20 has the separation spacing S2 (FIGS. 1, 3, and 8). Accordingly, in accordance with the first embodiment, when the fabricating assembly 70 is fully set up for operation it is in the second configuration, which is illustrated in FIG. 8.

A multipitch optical fiber ribbon of a second embodiment of the present invention is like the multipitch optical fiber ribbon 20 (FIG. 1) of the first embodiment, except that in the second embodiment the separation spacing S3 (FIG. 9) is defined between the optical fibers in the wide section (for example see the wide section 30 in FIGS. 1 and 3) of the multipitch optical fiber ribbon, and the wide section defines a greater width than the width W2 (FIG. 1). In accordance with the second embodiment, when the fabricating assembly 70 is fully set up for operation it is in the third configuration, which is illustrated in FIG. 9.

A multipitch optical fiber ribbon of a third embodiment of the present invention is like the multipitch optical fiber ribbon 20 (FIG. 1) of the first embodiment, except that in the third embodiment the separation spacing S4 (FIG. 10) is defined between the optical fibers in the wide section (for example see the wide section 30 in FIGS. 1 and 3) of the multipitch optical fiber ribbon, and the wide section defines a greater width than the width W2 (FIG. 1). In accordance with the third embodiment, when the fabricating assembly 70 is fully set up for operation it is in the fourth configuration, which is illustrated in FIG. 10.

As best understood with reference to FIGS. 1–3, in accordance with a fourth embodiment of the present invention, homogenous bonding material 42 is substituted for the composite bonding material 44 of the wide section 30 of the multipitch optical fiber ribbon 20. In accordance with the fourth embodiment, the tape application assemblies 76 illustrated in FIGS. 6 and 11 are replaced with conventional assemblies for applying the homogenous bonding material 42.

As best understood with reference to FIG. 11, in accordance with a fifth embodiment of the present invention, the frame 72 of the fabricating assembly 70 is stationery, and the exposed array 34 of optical fiber ribbons 36 are drawn past the guide cylinder 50 during the formation of the wide section 30 of the multipitch optical fiber ribbon 20. This is acceptably achieved by paying the exposed array 34 of optical fiber ribbons 36 off of an upstream supply roll (not shown) and wrapping the formed multipitch optical fiber ribbon 20 onto a downstream take-up roll (not shown).

Whereas the present invention is described above in the context of forming the multipitch optical fiber ribbon 20 from a previously formed conventional multipitch optical fiber ribbon 26, it is within the scope of the present invention for the fabricating assembly 70 to be used to construct a multipitch optical fiber ribbon or a single-pitch optical fiber ribbon from an array of optical fibers that were not previously associated with an optical fiber ribbon, as should be understood by those of ordinary skill in the art in view of this disclosure.

Many other modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An optical fiber ribbon that can be readily connected between first and second arrays of optical receptacles, wherein the spacing in the first array is different from the spacing in the second array, the optical fiber ribbon comprising:

an array of a plurality of optical fibers that extend longitudinally and are laterally adjacent; and bonding material having opposite first and second ends, wherein the bonding material bonds the optical fibers together at and between the first and second ends of the bonding material, and between the first and second ends of the bonding material the array is absent of splices between the optical fibers, and wherein:

the array comprises:
a longitudinally extending first segment extending from the first end of the bonding material toward the second end of the bonding material and terminating distant from the second end of the bonding material, and
a longitudinally extending second segment extending from the second end of the bonding material toward the first end of the bonding material and terminating proximate the first segment of the array and distant from the first end of the bonding material;

the bonding material comprises:
a longitudinally extending first bonding material that engages and bonds the optical fibers together along the first segment of the array, and
a longitudinally extending second bonding material that is different from the first bonding material, and that engages and bonds the optical fibers together along the second segment of the array; and lateral spacing defined between adjacent optical fibers is substantially uniform throughout the first segment of the array and varies in the longitudinal direction in the second section of the array, wherein a lateral first spacing is defined between adjacent optical fibers at the first end of the bonding material, a lateral second spacing is defined between adjacent optical fibers at the second end of the bonding material, and the first spacing is different from the second spacing.

2. An optical fiber ribbon according to claim 1, wherein the second spacing is at least approximately twice as great as the first spacing.

3. An optical fiber ribbon according to claim 1, wherein the second spacing is at least approximately three times greater than the first spacing.

4. An optical fiber ribbon according to claim 1, wherein the second spacing is at least approximately four times greater than the first spacing.

5. An optical fiber ribbon according to claim 1, wherein the first spacing is defined between centers of adjacent optical fibers and is approximately 250 microns, and the second spacing is defined between centers of adjacent optical fibers and is approximately 500 microns.

6. An optical fiber ribbon according to claim 1, wherein the first spacing is defined between centers of adjacent optical fibers and is approximately 250 microns, and the second spacing is defined between centers of adjacent optical fibers and is approximately 750 microns.

7. An optical fiber ribbon according to claim 1, wherein the first spacing is defined between centers of adjacent optical fibers and is approximately 250 microns, and the second spacing is defined between centers of adjacent optical fibers and is approximately 1000 microns.

8. An optical fiber ribbon according to claim 1, wherein between the first and second ends of the bonding material none of the optical fibers cross one another.

9. An optical fiber ribbon according to claim 1, wherein the first segment of the bonding material defines a first width, the second segment of the bonding material defines a second width, and the second width is greater than the first width.

10. An optical fiber ribbon according to claim 1, wherein the first and second bonding materials are contiguous.

11. An optical fiber ribbon according to claim 1, wherein:
the first bonding material comprises a solidified polymeric material that fills the interstices between the optical fibers and extends to the outside boundary of the optical fiber ribbon; and
the second bonding material comprises a tape and an adhesive backing on a side of the tape that is oriented toward the optical fibers.

\* \* \* \* \*